United States Patent [19]

Fujiwa et al.

[11] Patent Number: 5,556,927
[45] Date of Patent: Sep. 17, 1996

[54] CARBONATE GROUP-MODIFIED EPOXY RESIN, A PROCESS FOR THE PREPARATION THEREOF, AND A HEAT-CURABLE RESIN COMPOSITION

[75] Inventors: Takaaki Fujiwa; Takeharu Tabuchi; Hideki Matsui, all of Hiroshima-ken; Shinji Nakano, Osaka-fu; Shin-ya Yamada, Osaka-fu; Takao Morimoto, Osaka-fu, all of Japan

[73] Assignees: Daicel Chemical Industries, Ltd., Osaka-fu; Nippon Paint Co., Ltd., Osaka, both of Japan

[21] Appl. No.: 482,561

[22] Filed: Jun. 7, 1995

[30] Foreign Application Priority Data

Jun. 16, 1994 [JP] Japan .................................. 6-157894
Jul. 6, 1994 [JP] Japan .................................. 6-177634

[51] Int. Cl.$^6$ ......................... C08L 63/00; C08F 283/02
[52] U.S. Cl. ..................... 525/533; 525/438; 525/463
[58] Field of Search ..................................... 525/438, 463, 525/533

[56] References Cited

U.S. PATENT DOCUMENTS

| | | | |
|---|---|---|---|
| 4,255,301 | 3/1981 | Minagawa et al. ..................... | 549/335 |
| 4,521,570 | 6/1985 | Watanabe et al. ...................... | 525/533 |
| 4,522,984 | 6/1985 | Watanabe et al. ...................... | 525/533 |
| 4,766,184 | 8/1988 | Hefner, Jr. ............................... | 525/531 |
| 4,782,124 | 11/1988 | Hefner, Jr. et al. ...................... | 525/463 |
| 4,849,529 | 7/1989 | Mizutani et al. ....................... | 549/334 |
| 4,894,401 | 1/1990 | Nelson .................................... | 525/463 |
| 4,943,619 | 7/1990 | Bell et al. ............................... | 525/463 |
| 5,182,344 | 1/1993 | Parker .................................... | 525/463 |
| 5,264,497 | 11/1993 | Honig et al. ............................ | 525/453 |

*Primary Examiner*—Melvyn I. Marquis
*Assistant Examiner*—Randy Gulakowski
*Attorney, Agent, or Firm*—Sughrue, Mion, Zinn, Macpeak & Seas

[57] ABSTRACT

Disclosed are a carbonate group-modified epoxy resin in which carbonate groups are introduced into an epoxy resin having secondary hydroxyl groups at terminals or lactone-modified epoxy resin having primary hydroxyl groups at terminals by the ring-opening reaction of a cyclic alkylene carbonate, a process for the preparation thereof, and a thermosetting resin composition containing the carbonate group-modified epoxy resin.

5 Claims, 2 Drawing Sheets

CARBONATE GROUP-MODIFIED EPOXY RESIN, A PROCESS FOR THE PREPARATION THEREOF, AND A HEAT-CURABLE RESIN COMPOSITION

FIELD OF THE INVENTION

The present invention relates to a carbonate group-modified epoxy resin. In more detail, the present invention relates to a carbonate group-modified epoxy resin in which carbonate units are introduced into an epoxy resin having secondary hydroxyl groups at terminals or a lactone-modified epoxy resin having primary hydroxyl groups at terminals by the ring-opening reaction of a cyclic alkylene carbonate.

Furthermore, the present invention relates to a process for the preparation thereof.

Still further, the present invention relates to a thermosetting resin composition containing a film-formable resin having hydroxyalkyl carbonate groups and curing agents.

BACKGROUND OF THE INVENTION

An epoxy resin, particularly, a glycidyl ether epoxy resin prepared from bisphenol A and epichlorohydrin includes a great variety of types ranging from a liquid resin to a solid resin having a high molecular weight, and which is widely used in various fields.

A liquid resin having a low molecular weight, on the one hand, has a high reactivity in epoxy groups, and which is cured at normal temperatures with a polyamine or polyamide resin by utilizing the property and used as an adhesive, an FRP, or a flooring material. Furthermore, it can be cured by heating with a polybasic acid anhydride for molded products, especially in the electric industries.

On the other hand, an epoxy resin having a high molecular weight is a brittle solid resin having a melting point ranging from 60° to 150° C., and since the epoxy resin contains terminal epoxy groups and secondary hydroxyl groups, it is widely used in the field of coatings by utilizing the reactivity of hydroxyl groups.

For example, an epoxy ester obtained by esterification of the solid resin with an unsaturated fatty acid has been used as an air-drying coating or a baking coating in which a melamine resin is used as a cross-linking agent.

Furthermore, the epoxy ester resin has been used as a can-coating by being combined with a phenolic resin.

Still further, the solid epoxy resin has been used as epoxy-based powder coatings or cationic electrodeposition coatings by mixing with a blocked isocyanate.

As described hereinabove, although the epoxy resin is used in the various fields, it is rigid and brittle, and the hydroxyl groups are secondary. Accordingly, the reactivity with a cross-linking agent to be reacted to the hydroxyl groups is poor and a high temperature is required in baking and cross-linking. Furthermore, the epoxy resin has a disadvantage in that the weatherability is poor.

U.S. Pat. Nos. 4,522,984 and 4,521,570 [corresponding to the Japanese Patent Examined Publication (Kokoku) Nos. 1607/1987, 20251/1988, and 20252/1988] discloses an epoxy resin having an improved reactivity, a process in order to improve the poor reactivity in the secondary hydroxyl group, and a curable resin composition therefrom.

By Kokoku No. 1607/1987, the flexibility in the epoxy resin can be moderately improved by the ring-opening polymerization of epsilon-caprolactone and, further, the secondary hydroxyl group which is poor in reactivity can be changed to the primary hydroxyl group which is excellent in reactivity.

Kokoku No. 1607/1987 states that 97 to 5 parts by weight of an epoxy resin having secondary hydroxyl groups such as Araldite 6097, Araldite 6084, and Araldite 6071 which are products manufactured by Ciba-Geigy AG, is allowed to react with 3 to 95 parts by weight of epsilon-caprolactone in the presence of a catalyst such as a titanium compound, for example, tetrabutyltitanate or a halogenated tin compound at 100° to 200° C. to obtain an epsilon-caprolactone-modified epoxy resin having primary hydroxyl groups by ring-opening reaction.

However, even the epsilon-caprolactone-modified epoxy resin having primary hydroxyl groups has a problem that it is insufficient in water resistance.

In order to improve the insufficient water resistance in the epsilon-caprolactone-modified epoxy resin described hereinabove, an another attempt was made for modifying the secondary hydroxyl groups to primary hydroxyl groups.

As a result of an intensive investigation by the present inventors, it was found that an improved epoxy resin having a water resistance and further hydroxyalkyl carbonate groups which include primary hydroxyl groups having an excellent reactivity can be obtained by ring-opening reaction of a specified cyclic alkylene carbonate with an epoxy resin having secondary hydroxyl groups.

Furthermore, it was found that insufficient water resistance can also be improved without the loss of flexibility by the ring-opening reaction of a specified cyclic alkylene carbonate with the epsilon-caprolactone-modified epoxy resin described in the U.S. Patent.

In the meantime, a film-formable resin having hydroxyl groups can provide a cured article having three-dimensional network structures by using a curing agent such as a polyisocyanate compound or a melamine resin.

Accordingly, the resin has been used as a vehicle for curable coatings. Hitherto, acrylic resins, polyester resins, and epoxy resins, etc., have been used as the film-formable resin for purpose.

It is known that a film-formable resin having hydroxyl groups which are situated at a longer distance from the main structure in the polymer has a higher reactivity. Therefore, reactivity has been improved by the reaction of a lactone compound with hydroxyl groups in the film-formable resin. However, the resin modified by the lactone compound alone has the possibility of poor water resistance.

The thermosetting resin composition of the present invention has a higher reactivity than curable compositions prepared using conventional resins because the hydroxyl groups are situated at a greater distance from the main structure.

Furthermore, the thermosetting resin composition of the present invention has excellent water resistance because the main chains of the polymer and hydroxyl group are combined through carbonate groups.

SUMMARY OF THE INVENTION

It is an object of the present invention to provide a carbonate group-modified epoxy resin and a process for the preparation thereof.

It is another object of the present invention to provide a thermosetting resin composition having excellent properties.

A first aspect of the present invention relates to a carbonate group-modified epoxy resin represented by general formula (1)

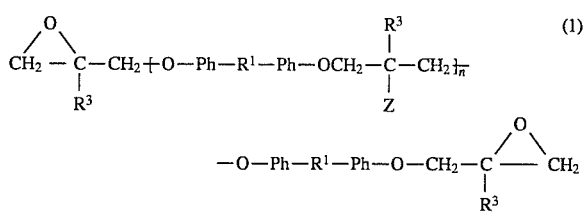  (1)

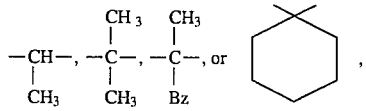

wherein structural unit —$R^1$— is —$CH_2$—,

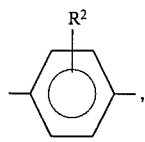

Bz is a phenyl group, and n is at least 1, —Ph— is

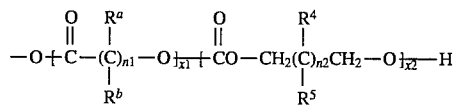

the substituted group $R^2$ is a hydrogen atom or a halogen atom, substituted group $R^3$ is hydrogen or a methyl group, the substituted unit Z is $$-O \underset{}{+} \underset{R^b}{\overset{\overset{O}{\|}\ R^a}{C-(C)_{n1}}} -O \underset{x1}{\underbrace{\ }} + CO - CH_2 \underset{R^5}{\overset{R^4}{(C)_{n2}}} CH_2 -O \underset{x2}{\underbrace{\ }} -H$$

wherein substituted groups Ra and R bare independently a hydrogen atom or a methyl group, substituted groups R4 and R5 are independently a hydrogen atom or an alkyl group having carbon number ranging from 1 to 20, n1 is an integer ranging from 1 to 7, n2 is an integer ranging from 0 to 4, X1 is an integer ranging from 0 to 100, and x2 is an integer ranging from 1 to 100.

A second aspect of the present invention relates to a process for the preparation of the carbonate group-modified epoxy resin represented by general formula (1), which comprises the ring-opening reaction of a cyclic alkylene carbonate with an epoxy resin or an epoxy resin modified by lactone compound alone having hydroxyl groups.

A third aspect of the present invention relates to a thermosetting resin composition which comprises (a) a film-formable resin having hydroxyalkyl carbonate groups represented by the following structural unit

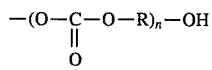

wherein, R is an alkylene group having a carbon number ranging from 2 to 8, n is an integer ranging from 1 to 6 in a molecule, and (b) a cross-linking agent capable of reacting with hydroxyl groups.

DETAILED DESCRIPTION OF THE INVENTION

Figure 1:
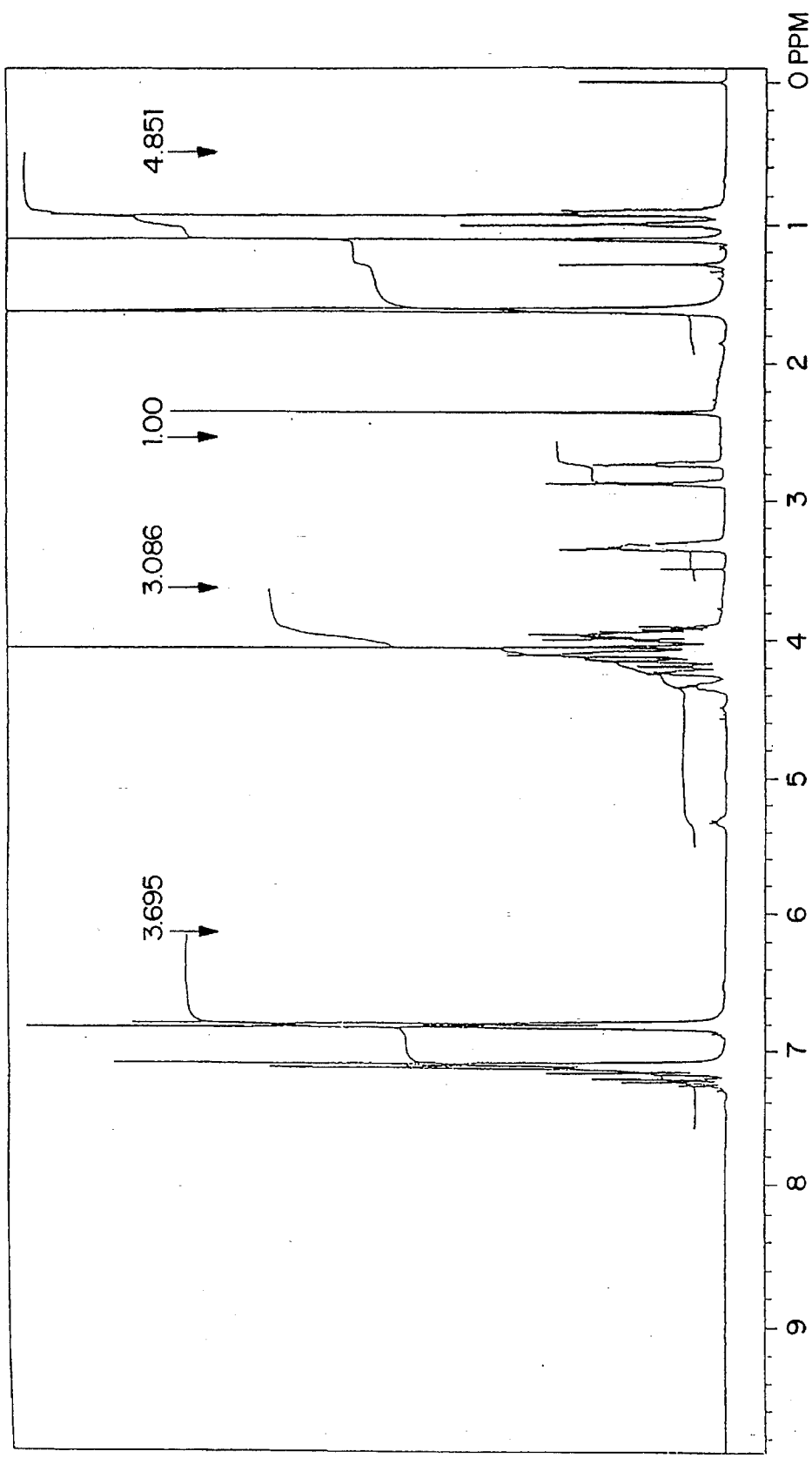
FIG. 1 is a 1H-NMR spectra chart related to the product obtained in Example 1.

The present invention will be described hereinafter in more detail.

According to a first aspect of the present invention, there is provided a carbonate group-modified epoxy resin represented by general formula (1)

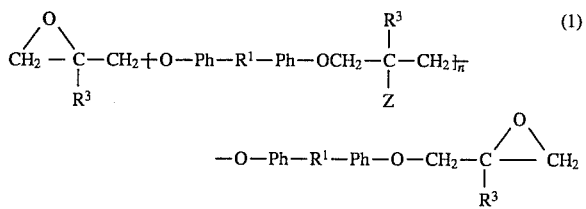  (1)

wherein structural unit —$R^1$— is —$CH_2$—

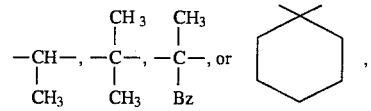

Bz is a phenyl group, and n is a least 1, structural unit —Ph— is

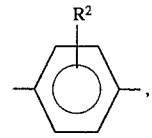

the substituted group R2 is a hydrogen atom or a halogen atom, substituted group R3 is hydrogen or a methyl group, structural unit Z is

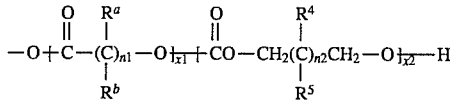

wherein substituted groups Ra and R bare independently a hydrogen atom or a methyl group, substituted groups R4 and R5 are independently a hydrogen atom or an alkyl group having a carbon number ranging from 1 to 20, n1 is an integer ranging from 1 to 7, n2 is an integer ranging from 0 to 5, x1 is an integer ranging from 0 to 100, and x2 is an integer ranging from 1 to 100.

In general formula (1), it is preferred that both of the substituted groups R2 and R3 are a hydrogen atom, both of substituted groups $R^4$ and $R^5$ are a methyl group, n1 is 5, and n2 is 1.

According to a second aspect of the present invention, there is provided a process for the preparation of a carbonate group-modified epoxy resin represented by general formula (1), which comprises the ring-opening reaction of a cyclic alkylene carbonate represented by general formula (3)

  (3)

wherein structural unit —R6— is

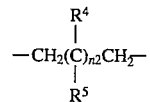

substituted groups R4 and R5 are independently hydrogen or an alkyl group having a carbon number ranging from 1 to 20, and n2 is an integer ranging from 0 to 4, with an epoxy resin or lactone-modified epoxy resin having hydroxyl groups represented by general formula (2)

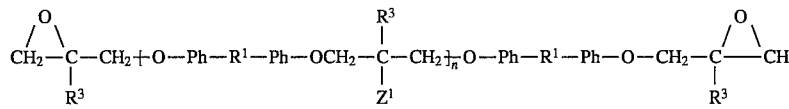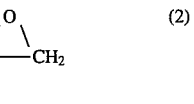 (2)

wherein structural unit —$R^1$— is —$CH_2$—

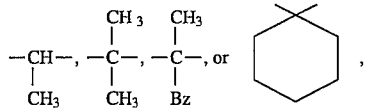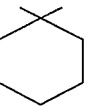

Bz is a phenyl group, and n is at least 1, structural unit —Ph— is

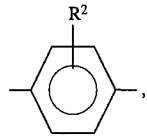

the substituted group R2 is a hydrogen atom or a halogen atom, substituted group R3 is a hydrogen or a methyl group, structural unit Z1 is

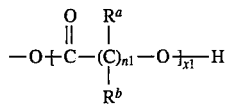

wherein N1 is an integer ranging from 1 to 7, substituted groups Ra and Rb are independently a hydrogen or a methyl group, and X1 is an integer ranging from 0 to 100.

In the carbonate group-modified epoxy resin of the present invention represented by general formula (1), the structural unit —R1— is —$CH_2$—,

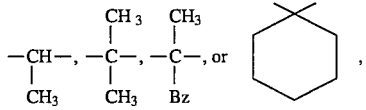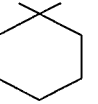

Bz in the structural unit —$R^1$— is a phenyl group, structural unit —Ph— is

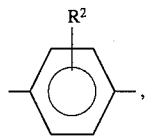

the substituted group $R^2$ in —Ph— is a hydrogen atom or a halogen atom which includes a chlorine atom or a bromine atom, substituted group R3 is hydrogen or a methyl group, n is at least 1, the structural unit Z is

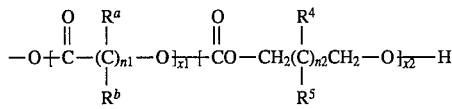

wherein substituted groups Ra and Rb are independently a hydrogen atom or a methyl group, substituted groups R4 and R5 are independently a hydrogen atom or an alkyl group having a carbon number ranging from 1 to 20, preferably from 1 to 5 which preferably includes a methyl group, n1 is an integer ranging from 1 to 7, n2 is an integer ranging from 0 to 4, x1 is an integer ranging from 0 to 100, and x2 is an integer ranging from 1 to 100.

x1 is preferably from 0 to 20, and more preferably from 0 to 5. X2 is preferably from 1 to 20, and more preferably from 1 to 6, from the viewpoint of capability of readily obtaining and stability.

X1 and X2 correspond to the amounts of the lactone compound and cyclic alkylene carbonate to be introduced into one mol of the lactone-modified epoxy resin having primary hydroxyl groups or the epoxy resin having secondary hydroxyl groups represented by general formula (2), respectively.

All of —R1—, —Ph—, $R^2$, $R^3$ and n depend upon the epoxy resin or lactone-modified epoxy resin having hydroxyl groups represented by general formula (2) to be employed as one of the starting materials.

Substituted groups R4, R5 and the structural unit —$R^6$— depends upon a cyclic alkylene carbonate which is another starting material to be employed. Substituted groups Ra and Rb depend upon a lactone compound to be employed in a lactone-modified epoxy resin having primary hydroxyl groups.

n is essentially at least 1, preferably ranges from 1 to 100, more preferably from 1 to 50.

In the case when n exceeds 100, the viscosity of the carbonate group-modified epoxy resin having primary hydroxyl groups becomes extremely high and, further, its solubility to solvents unpreferably becomes poor.

In the case when x1 exceeds 100, carbonate group-modified epoxy resin having primary hydroxyl groups becomes too soft.

In the case when x2 exceeds 100, the epoxy group contents in the carbonate group-modified epoxy resin obtained become lower, resulting in the a reactivity of the epoxy resin unpreferably decreasing in curing.

On the contrary, in the case when x2 is below 1, the reactivity and water resistance unpreferably cannot be improved in the carbonate group-modified epoxy resin obtained.

n1 and n2 depend upon the types of the lactone compound and the cyclic carbonate compound to be employed, respectively.

For example, in the case when substituted groups Ra and Rb are hydrogen, and n1 is 4, the lactone compound is valerolactone.

For example, in the case when substituted groups Ra and Rb are hydrogen, and n1 is 5, the lactone compound is epsilon-caprolactone, which is preferably employed.

The cyclic alkylene carbonate includes carbonates having a 5-member structure (1,3-dioxolane ring) such as ethylene carbonate, 1,2-propylene carbonate, 1,2-butylene carbonate, 2,3-butylene carbonate, and 1,2-pentylene carbonate, etc., carbonates having a 6-member structure (1,3-dioxane ring) such as 1,3-propylene carbonate, 1,3-butylene carbonate, 1,3-pentylene carbonate, and 2,4-pentylene carbonate, 2,2-dimethyl-1,3-propylene carbonate (referred to as neopentylglycol carbonate or 5,5-dimethyl-1,3-dioxane-2-on), and carbonates having a 7-member structure (1,3-dioxepane ring) such as 1,4-butylene carbonate, and 1,4-pentylene carbonate. For example, in the case when both of substituted groups R4 and R5 in the structural unit R6 are hydrogen, and n2 is 0, the cyclic alkylene carbonate is ethylene carbonate, in the case when n2 is 1, it is propylene carbonate, in the case when n2 is 2, is 1,4-butanediol carbonate.

Furthermore, in the case when both of substituted groups R4 and R5 are a methyl group, and n2 is 1, the cyclic alkylene carbonate is neopentylglycol carbonate, which is a preferred carbonate. Mol numbers to be added are 6 at most, usually 1–4 mol per one hydroxyl group.

Neopentylglycol carbonate can be prepared through relatively simple steps from starting materials readily obtainable in an industrial fashion and, further, the carbonate is stable in a normal state.

Furthermore, neopentylglycol carbonate can be readily copolymerized with an epoxy resin having hydroxyl groups which is another starting material of the present carbonate group-modified epoxy resin by an industrially-enabled process.

Cyclic alkylene carbonate can be prepared by depolymerization of a polymer which is produced by the reaction between a glycol and a dialkyl carbonate in the presence of basic catalysts, as described in Japanese Patent Examined Publication (Kokoku) No. 56356/1990. Otherwise, it can also be produced by the reaction between an alkyleneoxide and carbon dioxide.

The lactone-modified epoxy resin having primary hydroxyl groups represented by general formula (2) can be prepared by the ring-opening reaction of a lactone compound such as epsilon caprolactone with an epoxy resin having secondary hydroxyl groups as described in U.S. Pat. No. 4,522,984.

In general formula (2), in the case when x1 is 0, that is, the structural unit Z is a hydroxyl group, the epoxy resin having hydroxyl groups is not modified with a lactone compound.

Specific examples of the epoxy resin having secondary hydroxyl groups include embodiments described as follows:

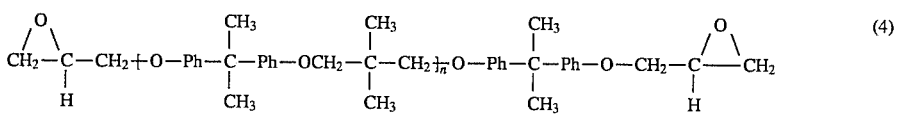 (4)

[n is at least 1, and structural unit —Ph— is

which is prepared from bisphenol A and epichlorohydrin,

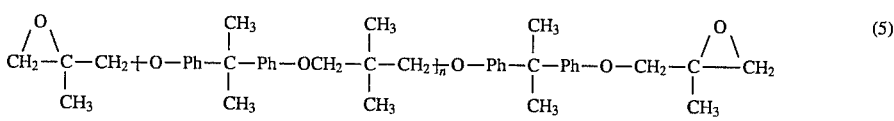 (5)

[n is at least 1, and structural unit —Ph— is

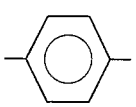

which is prepared from bisphenol A and beta-methyl epichlorohydrin, in which the Araldite series manufactured by Nihon Ciba-Geigy, Ltd. Epikote series or manufactured by Shell Chemical, Ltd., etc., are typical,

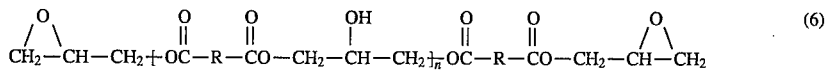

(6)

[n is at least 1, and R is an alkylene group or aromatic group] which is a glycidyl ester epoxy resin prepared from a dicarboxylic acid and epichlorohydrin,

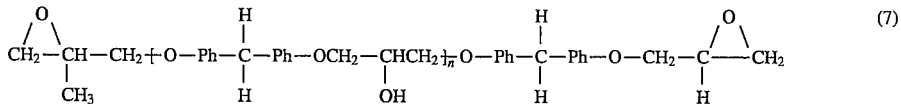

(7)

[n is at least 1, and structural unit —Ph— is

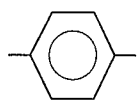

which is a glycidyl ether epoxy resin prepared from a bisphenol F and epichlorohydrin, and

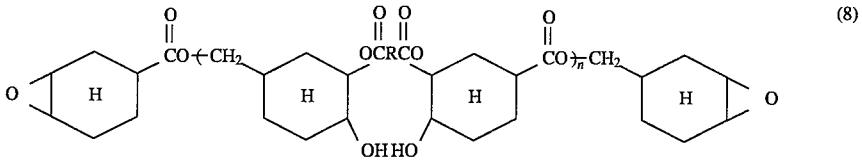

(8)

[n is at least 1, and R is an alkylene group or aromatic group] which is an alicyclic epoxy resin.

A process for the preparation of a carbonate group-modified epoxy resin of the present invention is described below in detail.

Starting materials in the present invention are the above-described cyclic alkylene carbonate and the above-described epoxy resins (4), (5), (6), (7), and (8), having hydroxyl groups or lactone adducts thereof having hydroxyl groups.

The lactone adducts can be prepared by the ring-opening reaction of lactone compounds with the above-described epoxy resins (4), (5), (6), (7), and (8) having secondary hydroxyl groups as described in U.S. Pat. No. 4,522,984 [corresponding to the Japanese Patent Examined Publication (Kokoku) No. 1607/1987].

As described hereinabove, the U.S. Patent states that from 97 to 5 parts by weight of the epoxy resins having secondary hydroxyl groups such as the above-described (4), (5), (6), (7), and (8) are allowed to react with from 3 to 95 parts by weight of epsilon-caprolactone at 100° to 200° C. in the presence of catalysts such as tetrabutyltitanate or halogenated stannous compounds to obtain epsilon-caprolactone-modified epoxy resins having primary hydroxyl groups.

In the present invention, epoxy resins having primary hydroxyl groups modified by lactone compounds other than epsilon-caprolactone can be also employed as an epoxy resin represented by general formula (2).

Examples of the lactone-modified epoxy resins having hydroxyl groups specifically include products referred to as PCL-G manufactured by Daicel Chemical Industries, Ltd.

A carbonate group-modified epoxy resin of the present invention is prepared by the ring-opening addition reaction of the above-described cyclic alkylene carbonate with the above-described epoxy resin having hydroxyl groups at from an ambient temperature to 180° C., preferably, from 60° C. to 140° C.

In the case when the temperature is below ambient temperatures, the reaction rate is unpreferably low, and contrarily, in the case when the reaction temperature exceeds 180° C., the cyclic alkylene carbonate unpreferably decomposes accompanying side reactions such as decarboxylation, etc., from carbonate bonds.

In the ring-opening reaction, catalysts can be preferably employed.

Specific examples of the catalysts include strongly acidic cation-exchange resins (H type) such as Amberlist 15, Bronsted acids such as hydrogen fluoride, hydrogen chloride, hydrogen bromide, sulfuric acid, p-toluene sulfonic acid, dodecylbenzene sulfonic acid, methane sulfonic acid, trifluoroacetic acid, and trifluoromethane sulfonic acid, etc.

Furthermore, anionic onium salts of Bronsted acids such as onium salts of nitrogen, sulfur, phosphor, and iodine can be also employed.

Typical examples of the catalysts include an organic tin compound such as dibutyltin oxide, dibutyltin dilaurate, monobutyltin trichloride, dibutyltin dichloride, tributyltin monochloride, and hydroxybutyltin oxide, a halogenated tin compound such as stannous chloride, stannous bromide, and stannous iodide, etc., phosphorus wolframate, silicotungstenic acid, a quaternary ammonium salt type compound such as N,N-dimethyl-N-benzylanilinium antimony hexafluoride, N,N-diethyl-N-benzylanilinium boron tetrafluoride, N,N-diethyl-N-benzylanilinium antimony hexafluoride, N,N-diethyl-N-benzylanilinium antimony hexafluoride, N,N-diethyl-N-benzylanilinium trifluoromethane sulfonic acid, N,N-dimethyl-N-(4-methoxybenzyl) pyrizinium antimony hexafluoride, N,N-diethyl-N-(4-methoxybenzyl) toluidinium antimony hexafluoride, N,N-dimethyl-N-(4-methoxybenzyl) toluidinium antimony hexafluoride, a sulfonium salt compound such as triphenylsulfonium borontetrafluoride, triphenylsulfonium antimony hexafluoride, triphenylsulfonium arsenic hexafluoride, Adeka CP-66 [manufactured by Asahi-Denka Kogyo, Ltd.], Adeka CP-77 [manufactured by Asahi-Denka Kogyo, Ltd.], tri(4-methoxyphenyl) sulfonium arsenic hexafluoride, diphenyl(4-phenylthiophenyl) sulfonium arsenic hexafluoride, a phosphonuium salt type compound such as ethyltriphenyl phosphonium antimony hexafluoride, tetrabutyl phosphonium antimony hexafluoride, an iodonium salt compound such as diphenyliodonium arsenic hexafluoride, di-4-chlorophenyliodonium arsenic hexafluoride, di-4-chromphenyliodonium arsenic hexafluoride, di-p-triiodonium arsenic hexafluoride, and phenyl(4-methoxyphenyl) iodonium arsenic hexafluoride.

There may be also employed onium salts in which anionic components in the above-described onium salts are replaced by, for example, the anoionic component in an aliphatic carboxylic acid such as acetic acid, propionic acid, octanoic acid, lauric acid, stearic acid, etc., an aromatic carboxylic acid such as benzoic acid, an aromatic sulfonic acid such as benzene sulfonic acid, toluene sulfonic acid, dodecylbenzene sulfonic acid, or anionic components of perchloric acid, etc.

The use amount of the catalyst ranges from 1 ppm to 5%, preferably from 500 ppm to 1% based on the total weight of the epoxy resin or lactone-modified epoxy resin and the cyclic alkylene carbonate.

In the case when the amount is below 1 ppm, the reaction rate becomes considerably slow, resulting in being substantially meaningless.

On the contrary, in the case when the amount exceeds 5%, the cyclic alkylene carbonate unpreferably decomposes accompanying side reactions such as decarboxylation, etc., and further it requires a means of removal.

In the case when a cation-exchange resin is employed as a catalyst, there may be ion exchange equivalent corresponding to the use amount of a Bronsted acid. The cation-exchange resin employed as catalyst can be preferably employed repeatedly.

The ring-opening reaction can be conducted in the absence or presence of solvents such as aromatic hydrocarbon including benzene and toluene, etc., esters including ethyl acetate and butyl acetate, etc., ketones including acetone and methylisobutyl ketone, etc., halogenated hydrocarbons including dichloromethane and dichloroethane, etc., and ethers including tetrahydrofuran, 1,4-dioxane, etc., acetonitrile, nitrobenzene, nitromethane, etc., which are inert organic solvents not containing active hydrogen atoms.

The use of inert organic solvents are preferably effective for reducing viscosity of a crude solution in the polymerization system after the completion of polymerization and, further, polymerization temperatures can be readily controlled.

The use amount of the inner solvents ranges from 5 to 80% by weight, preferably from 10% to 50% by weight based on the total weight of the epoxy resin or lactone-modified epoxy resin and the cyclic alkylene carbonate.

In the case when the use amount exceeds 80% by weight, the reaction rate becomes unpreferably slow. On the contrary, in the case when the use amount is below 5% by weight, the effect for reducing viscosity becomes meaninglessly minor.

The completion of the ring-opening reaction of the cyclic alkylene carbonate with the epoxy resin or lactone-modified epoxy resin having hydroxy groups can be monitored by methods such as gaschromatography, etc.

Although the concentration of the cyclic alkylene carbonate less than 1% by weight is generally regarded as the completion of reaction, since cyclic alkylene carbonate can be recirculated into the reaction system as a starting material, unreacted cyclic alkylene carbonate may remain in the system.

It is to be noted that, even in the case when solvents are employed, it is not necessary to remove solvents, depending upon the potential uses involved.

According to a third aspect of the present invention, there is provided a thermosetting resin composition which comprises (a) a film-formable resin having hydroxyalkyl carbonate groups represented by the following structural unit

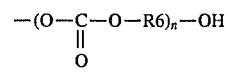

wherein, R6 is an alkylene group having a carbon number ranging from 2 to 86, n is an integer ranging from 1 to 6 in a molecule, and (b) a crosslinking agent capable of reacting with hydroxyl groups.

The film-forming resin having hydroxyalkyl carbonate groups represented by the above-described structural unit can be prepared by the ring-opening reaction of the above-described cyclic carbonate compound of the formula (3)

wherein structural unit —R6— is

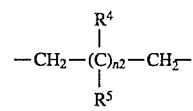

substituted groups R4 and $R^5$ are independently hydrogen or an alkyl group having a carbon number ranging from 1 to 20, and n2 is an integer ranging from 0 to 4, with an acrylic resin, a polyester resin, and an epoxy resin having a plurality of hydroxyl groups in their molecules in the presence of catalysts.

Starting materials of the acrylic resin having hydroxyalkyl carbonate groups are acrylic polymers having a plurality of hydroxyl groups in their molecules, starting materials of the polyester resin having hydroxyl carbonate groups are polyester polyols, and starting materials of the epoxy resin having hydroxyl carbonate groups are bisphenol type epoxy resins having a plurality of hydroxyl groups in their molecules.

Starting acrylic polymers can be obtained by the copolymerization of hydroxyalkyl(meth)acrylate, for example, such as 2-hydroxyethylmethacrylate, 3-hydroxypropylacrylate, 4-hydroxybutylacrylate, and/or lactone adducts such as 2-hydroxyethyl(meth)acrylate/caprolactone adducts known as Placcel FA and FM (a trade name of Daicel Chemical Industries, Ltd.) with other ethylenically unsaturated monomers, which is a conventional process.

As examples of the ethylenically unsaturated monomer, there are exemplified an alkyl ester (methyl, ethyl, n-propyl, isopropyl, n-butyl, sec-butyl, t-butyl, and 2-ethylhexyl, etc.) of acrylic acid or methacrylic acid, acrylonitrile, styrene, alpha-methylstyrene, vinyl acetate, and vinyl propionate, etc.

Such the ring-opening reaction of the cyclic alkylene carbonate compound with the acrylic polymers having hydroxyl groups is a subject matter in Japanese Patent Unexamined Publication (Kokai) No. 010920/1995 by the same applicants, and the subject matter is partially included in the third aspect of the present invention.

The acrylic resins having hydroxylalkyl carbonate groups can be prepared by the copolymerization with 95-5 mol% of ethylenically unsaturated monomers after the ring-opening reaction of the cyclic alkylene carbonate compound with the hydroxyalkyl(meth)acrylate or lactone adducts thereof. The process is a subject matter in Japanese Patent Application No. 294506/1993 by the same applicants, and the subject matter is partially included in the third aspect of the present invention.

In the case when the acrylic resins are a starting material, the carbonate group-modified film-formable resin has following general formula;

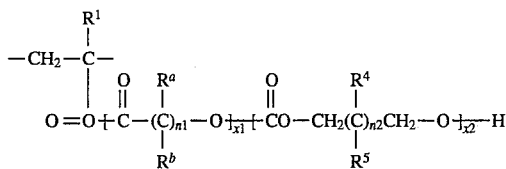

wherein substituted groups Ra and R bare independently a hydrogen atom or a methyl group, substituted groups R4 and R5 are independently a hydrogen atom or an alkyl group having carbon number ranging from 1 to 20, n1 is an integer ranging from 1 to 7, n2 is an integer ranging from 0 to 4, x1 is 0 or an integer ranging from 1 to 6, and x2 is an integer ranging from 1 to 6.

The polyester polyols can be prepared by condensation polymerization between polybasic acids and polyvalent alcohols.

As the acids, there are exemplified aromatic dicarboxylic acids or anhydrides thereof such as terephthalic acid, isophthalic acid, phthalic acid, phthalic anhydride, 2,6-naphthalene dicarboxylic acid, 2,7-naphthalene dicarboxylic acid, aliphatic dicarboxylic acids or anhydrides thereof such as succinic acid, adipic acid, azelaic acid, sebasic acid, dodecane dicarboxylic acid, 1,4-cyclohexane dicarboxylic acid, polyvalent carboxylic acid more than trivalent or anhydride thereof such as trimellitic acid, pyromellitic acid, etc.

As the polyvalent alcohols, there are exemplified diols such as ethyleneglycol, 1,2- or 1,3-propanediol, 1,2-, 1,3-, 2,3-, and 1,4-butanediol, 1,2-, 2,3-, 1,4-, and 1,5-pentanediol, neopentyl glycol, 1,4-, 2,5-, and 1,6-hexanediol, 3-methyl-1,5-pentanediol, 1,2-dodecanediol, 1,2-octadecanediol, diethyleneglycol, triethyleneglycol, 1,4-hexanediol, and 1,4-cyclohexanedimethanol, etc., polyvalent alcohols such as glycerine, trimethylol propane, and pentaerythritol, etc.

In the condensation polymerization, the acids and the polyvalent alcohols may be allowed to react in such a ratio as polyesters obtained include hydroxyl groups at least two terminals by a normal process.

The ring-opening reaction of the cyclic alkylene carbonate with polyester polyols is a subject matter in Japanese Patent Application No. 294507/1993 by the same applicants, and the subject matter is partially included in the third aspect of the present invention.

In the case when the polyester resin is a starting material, the carbonate group-modified film-formable resin has following general formula;

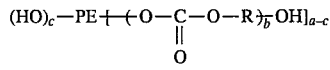

wherein PE is a residual group except hydroxyl groups in the polyester resin, R6 is an alkylene group having a carbon number ranging from 2 to 86, a is an integer ranging from 2 to 15, b is an integer ranging from 1 to 6, c is an integer related by $0 \leq c < a$.

The ring-opening addition reaction of the cyclic alkylene carbonate with bisphenol epoxy resins is described hereinabove as the second aspect of the present invention.

In the ring-opening addition reaction of the cyclic alkylene carbonates with the acrylic resins or the polyester polyols, there may be also employed carbonates having a 5-member structure (1,3-dioxolane ring), carbonates having a 6-member structure (1,3-dioxane ring), and carbonates having a 7-member structure (1,3-dioxepane ring) as described in the second aspect of the present invention.

Furthermore, other reaction conditions such as preferred temperatures solvents, and catalysts may be also applied, as described in the second aspect of the present invention.

The carbonate group-modified film-formable resin which can be prepared by the process described hereinabove is cross-linked and cured by a curing agent capable of reacting with the hydroxyl group to obtain the thermosetting resin composition of the present invention.

Examples of the curing agent capable of reacting with the hydroxyl group specifically include melamine resins such as a methylol melamine and its products etherized by a lower alkanol such as methanol, ethanol, and butanol, etc., and polyisocyanate compounds.

In the case when a polyisocyanate compound is employed as a curing agent, the resin composition of the present invention must be stored by separating into the above-described two components, (a) and (b), from the viewpoint of storage stability. In the case when a blocked polyisocyanate compound is employed as a curing agent, the resin composition can be stored as a mixture containing the above-described two components, (a) and (b).

Specific examples of the polyisocyanate compound include aromatic, cycloaliphatic, and aliphatic polyisocyanates such as tolylene diisocyanate, xylylene diisocyanate, phenylene diisocyanate, bis(isocyanatemethyl)cyclohexane, tetramethylenediisocyanate, hexamethylenediisocyanate, methylene diisocyanate, isophorone diisocyanate, and further a dimer or trimer thereof. Furthermore, prepolymers are also included having isocyanate groups at terminals which are prepared by the reaction of an excessive amount of the polyisocyanate compounds with a low molecular weight compound having active hydrogen atoms such as ethyleneglycol, propyleneglycol, trimethylolpropane, hexanetriol, and caster oil, etc.

Still further, a blocked polyisocyanate compound in which a block agent is combined with isocyanate groups by an addition reaction can be employed as a curing agent having a reactivity with hydroxyl groups.

It is important that the blocked polyisocyanate compound has a stability at ordinary temperatures and, further, that it can regenerate free isocyanate groups by dissociation of the block agent when heated at temperatures higher than its dissociation temperature.

Specific examples of the block agent include phenol-based block agents such as phenol, cresol, xylenol, chlorophenol, and ethylphenol, etc., lactam-based block agents such as epsilon-caprolactam, deltavalerolactam, gamma-butylolactam, and beta-propiolactam, etc., active methylene-based block agents such as acetoethyllactate and acetyllactone, etc., alcohol-based block agents such as methanol, ethanol, propanol, butanol, amyl alcohol, ethyleneglycol monomethylether, ethyleneglycol monoethylether, ethyleneglycol monobutylether, diethyleneglycol monomethylether, propyleneglycol monomethylether, benzyl alcohol, methyl or butyl ester of glycollic acid, diacetonealcohol, methyllactate, and ethyllactate, etc., oxime-based block agents such as formaldoxime, acetoaldoxime, acetoxime, methylethylketoxime, diacetylmonoxime, and cyclohexaneoxime, etc., mercaptan-based block agents such as butylmercaptan, thiophenol, methylthiophenol, and ethylthiophenol, etc., acid-amide-based block agents such as acetic amide, and benzamide, etc., imide-based block agents such as imide succinate, and maleic imide, etc., amine-based block agents such as xylidine, aniline, butylamine, and dibutylamine, etc., imidazole-based block agents such as imidazole, and 2-ethylimidazole, etc., imine-based block agents such as ethyleneimine and propyleneimine, etc.

In the thermosetting resin composition of the present invention, mixing ratio of component (a) with component (b) depends upon the type of the curing agents and the degree of curing to be desired.

In the case when a melamine resin is employed as a curing agent, the ratio of (a)/(b) ranges from 50/50 to 95/5 based on the total weight of solids in the (a) and (b). In the case when a polyisocyanate compound is employed as a curing agent, the ratio of (a)/(b) ranges from 1/1 to 1/0.2 based on the equivalent ratio of —OH group/—NCO group.

The thermosetting resin composition of the present invention may be optionally mixed with organic solvents such as alcohols including methanol, and butanol, etc., aromatic hydrocarbons including benzene, and toluene, etc., esters including ethyl acetate and butyl acetate, etc., ketones including acetone and methylisobutyl ketone, etc., halogenated hydrocarbons including dichloromethane and dichloroethane, etc., ethers including tetrahydrofuran, 1,4-dioxane, etc., acetonitrile, nitrobenzene, and nitromethane, etc.

Preferred catalysts may be also mixed in the thermosetting resin composition of the present invention in order to adjust curing temperatures.

In this case when a melamine rein is employed as a curing agent, there may be employed Bronsted acids such as hydrogen fluoride, hydrogen chloride, hydrogen bromide, sulfuric acid, p-toluene sulfonic acid, methane sulfonic acid, dodecylbenzene sulfonic acid, trifluoroacetic acid, and trifluoromethane sulfonic acid, etc.

In the case when a polyisocyanate compound is employed as a curing agent, there may be employed stannic chloride, dibutyltin oxide, and dibutyltin dilaurate, etc. The amount of the catalysts used may be minor amounts, specifically, ranges from 0.1% to approximately 0.1% based on the total starting materials.

The present invention is illustrated below by Examples and Comparative Examples.

<EXAMPLE 1>

Preparation of a Carbonate Group-Modified Epoxy Resin

A 200-milliliter four-necked flask equipped with a tube for supplying nitrogen, a thermometer, a reflux condenser, and a stirrer was charged with 70 g of a bisphenol epoxy resin having hydroxyl groups (Araldite 6071 manufactured by Nihon Ciba-Geigy, Ltd.), 30 g of dimethyltrimethylene carbonate (another name for this material is neopentylglycol carbonate), 8.9 g of toluene as a solvent, and 0.1 g of pyridinium salt of p-toluenesulfonic acid as a catalyst, followed by allowing the mixture to react in an atmosphere of nitrogen gas for 9 hours to obtain a carbonate group-modified epoxy resin generated by ring-opening of the dimethyltrimethylene carbonate.

It was confirmed by measurement using a gas-chromatograph that the conversion of dimethyltrimethylene carbonate is 47%.

The 1H-NMR chart related to the resultant polymer is shown in FIG. 1. Characteristic signals in the chart are assigned as follows: 0.89–1.03 ppm: methyl group in linear dimethyltrimethylene carbonate, 2.71–2.77 ppm and 2.86–2.92 ppm: proton in epoxy group, 3.29–3.33 ppm and 3.35–3.38 ppm: methylene group in linear dimethyltrimethylene carbonate which is adjacent to terminal hydroxyl group, and 5.32–5.48 ppm: methine proton in linear dimethyltrimethylene carbonate.

Figure 2:
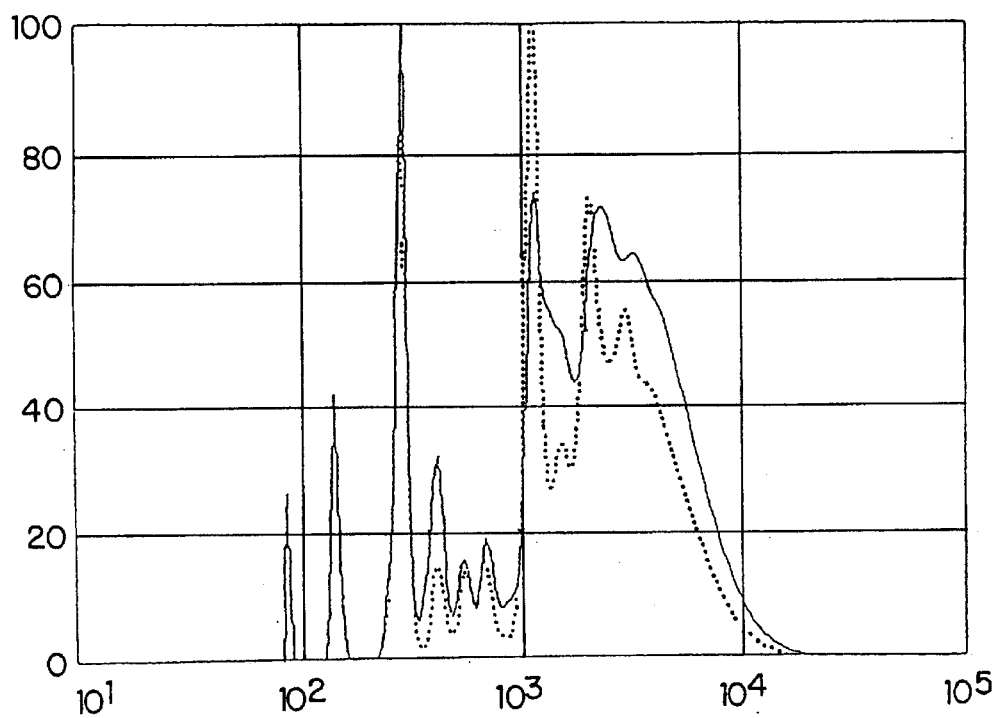
FIG. 2 is a GPC chart related to the product obtained in Example 1.

The GPC chart related to the starting Araldite 6071 and the resin is shown in FIG. 2, in which the dotted curve is the differential molecular weight distribution curve concerning the starting Araldite 6071, and the solid curve is the differential molecular weight distribution curve concerning the resin.

It was confirmed by comparison between the two curves in the FIG. 2 that the epoxy resin generated by the ring-opening reaction of dimethyltrimethylene carbonate is shifted to the higher molecular side compared to the starting Araldite 6071.

It was confirmed by the 1H-NMR and GPC analyses that the epoxy resin obtained has the following chemical formula:

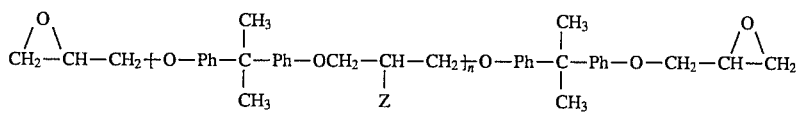

wherein n is approximately 2.44, structural unit —Ph— is

and Z is the structural unit

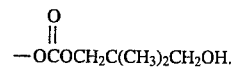

<EXAMPLE 2>

The same procedures as described in Example 1 were repeated except that 0.21 g of pyridinium salt of p-toluenesulfonic acid was not employed to obtain a carbonate group modified epoxy resin.

It was confirmed by measurement using a gaschromatograph that the conversion of dimethyltrimethylene carbonate is approximately 60%.

<EXAMPLE 3>

A 200-milliliter four-necked flask equipped with a tube for supplying nitrogen, a thermometer, a reflux condenser, and a stirrer was charged with 70 g of a lactone-modified bisphenol epoxy resin having hydroxyl groups (PCL-G105 manufactured by Daicel Chemical Industries, Ltd.), 30 g of dimethyltrimethylene carbonate (another name for this material is neopentylglycol carbonate), 8.9 g of toluene as a solvent, and 0.21 g of pyridinium salt of p-toluenesulfonic acid as a catalyst, followed by allowing the mixture to react in an atmosphere of nitrogen gas for 10 hours to obtain a polymer containing linear dimethyltrimethylene carbonate units.

It was confirmed by monitoring with a gas-chromatograph that conversion of dimethyltrimethylene carbonate is 60%.

<EXAMPLE 4>

Preparation of Polyester Resins A' and A

A reaction vessel equipped with a heating equipment, a stirrer, a reflux equipment, a water separator, a rectification tower, and a thermometer is charged with 233 parts of trimethylol propane, 319 parts of neopentylglycol, 188 parts of 1,6-hexanediol, followed by heating at 80°–120° C. to dissolve. At a period capable of stirring, stirring was initiated, and further 707 parts of isophthalic acid and 155 parts of adipic acid were charged, followed by elevating the temperature to 180° C.

At a period when dehydration by condensation reaction was initiated, temperature was elevated to 230° C. at a constant rate while removing water out of the system by distillation over 3 hours.

When the temperature attained to 230° C., the reaction was continued for 2 hours at the temperature. Successively, xylol was charged into the reaction vessel, and the condensation reaction was continued by a xylol reflux method. The reaction was terminated when an acid value attained to 15, followed by being cooled. After cooled, 600 parts of xylol was charged to obtain a polyester resin. The polyester resin was designated as Polyester resin A'.

Successively, 280.0 g of 5,5-dimethyl-1,3-dioxane-2-on and 1.0 g of p-toluene sulfonic acid-1H$_2$O were charged in the Polyester A', followed by allowing to react at 40° C. for 90 minutes to obtain a polymer having properties as described below. The polymer was designated as Polyester resin A.

Nonvolatile component: 73.4%, Acid value of Varnish: 8.1 mg KOH/g,

Hydroxyl value: 125 mg KOH/g

IR: 3450 cm$^{-1}$ (OH), 1745 cm$^{-1}$ (O—CO—O), 1720 cm$^{-1}$ (COO)

<EXAMPLE 5>

Preparation of Polyester Resin B

A reaction vessel equipped with a heating equipment, a stirrer, a reflux equipment, a water separator, a rectification tower, and a thermometer was charged with 324 parts of trimethylol propane, 165 parts of 1,5-pentanediol, 134 parts of 1,6-hexanediol, followed by elevating the temperature to 80°–120° C. to dissolve. At a period capable of stirring, stirring was started, and further 356 parts of phthalic anhydride and 399 parts of isophthalic anhydride were charged, followed by elevating the temperature to 180° C.

At a period when dehydration by condensation reaction was initiated, the temperature was elevated to 230° C. at a constant rate while removing water out of the system by distillation over 3 hours.

When the temperature attained to 230° C., the reaction was continued for 2 hours at the temperature. Successively, xylol was charged into the reaction vessel, and the condensation reaction was continued by a xylol reflux method. The reaction was terminated when an acid value attained to 8, followed by being cooled. After cooled, 810 parts of xylol was charged.

Successively, 121.5 g of 5,5-dimethyl-1,3-dioxane-2-on and 10.0 g of Amberlist 15E were charged, followed allowing to react at 70° C. for 50 minutes to obtain a polymer having properties as described below.

The polymer was designated as Polyester resin B.

Nonvolatile components: 62.2%, Acid value of Varnish: 4 mg KOH/g,

Hydroxyl value: 126 mg KOH/g

IR: 3450 cm$^{-1}$ (OH), 1745 cm$^{-1}$ (O—CO—O), 1720 cm$^{-1}$ (COO)

<EXAMPLE 6>

Preparation of Acrylic Resin C

A reaction vessel was charged with 19.2 g of xylene and 4.8 g of butanol, followed by heating to 120° C. Successively, a mixture composed of 28.0 g of styrene, 12.0 g of 2-hydroxyethylmethacrylate, and 1.2 g of tertiary butyl peroctoate was added dropwise over 2 hours. At the completion of dropwise addition, the reaction was completed while maintaining reaction liquid at 120° C. for 3 hours. A polymer solution obtained was charged into methanol, and a polymer having properties as described below was isolated by precipitation.

The polymer was designated as Acrylic resin C.

Mn: 13000, Mw/Mn: 1.7, Hydroxyl Value (KOH mg/g): 131

10 g of the Acrylic resin C was weighed and then 10 g of toluene was charged into a reaction vessel to dissolve while heating. 3.0 g of 5,5-dimethyl-1,3-dioxane-2-on and 0.044 g of p-toluene sulfonic acid-1H$_2$O were charged in order to allow to react at 120° C. for 90 minutes. After the completion of the reaction, a polymer solution obtained was charged into methanol, and a polymer was isolated by precipitation.

Mn: 19900, Mw/Mn: 1.9, Hydroxyl Value (KOH mg/g): 99

IR: 3450 cm$^{-1}$ (OH), 1745 cm$^{-1}$ (O—CO—O), 1720 cm$^{-1}$ (COO)

<EXAMPLE 7>

Preparation of Acrylic Resin D 3.414 g (0.026 mol) of 5,5-dimethyl-1,3-dioxane-2-on was added to 12.688 g of Placcel FM-1 (a 2-hydroxyethylmethacrylate/epsilon-caprolactone adduct having the molar ratio of 1/1 manufactured by Daicel Chemical Industries, Ltd.) to dissolve by heating, followed by stirring while heating at 40° C. for 60 minutes after adding 0.049 g (0.026 mmol) of p-toluene sulfonic acid-1H$_2$O.

After the completion of the reaction, the reaction mixture was poured in 150 g of benzene, and a solid precipitated was filtered. Filtered liquid was concentrated to obtain a modified monomer having properties as described below.

IR: 3450 cm$^{-1}$ (OH), 1745 cm$^{-1}$ (O—CO—O), 1720 cm$^{-1}$ (COO)

$^1$H-NMR: delta 0.8 [s, 6H, —C(CH$_3$)$_2$—], 3.1 [s, 6H, —C(CH$_3$)$_2$—CH$_2$—OH], [OCOOCH$_2$C(CH$_3$)$_2$—]

19.2 g of xylene and 4.8 g of butanol were weighed and charged into a reaction vessel and heated to 120° C. Into the vessel, a mixture composed of 2.8 g of styrene, 12.0 g of the modified monomer, and 1.2 g of tertiary butyl peroctoate was added dropwise over 2 hours. After the completion of dropwise addition, the reaction was completed terminated while further maintaining the reaction solution at 120° C. for 3 hours. Polymer solution obtained was charged into methanol, and a polymer having properties as described below was isolated by precipitation.

The polymer was designated as Acrylic Resin D.

Mn: 19900, Mw/Mn: 1.9, Hydroxyl Value (KOH mg/g): 99

IR: 3450 cm$^{-1}$ (OH), 1745 cm$^{-1}$ (O—CO—O), 1720 cm$^{-1}$ (COO)

<EXAMPLE 8>

60 g of the carbonate group-modified epoxy resin prepared in Example 1 was mixed with 30 g of a diisocyanate (Sumidule N3500 manufactured by Sumitomo-Bayer Urethane, Co. Ltd.) and 0.036 g of dibutyltin dilaurate to prepare a thermosetting resin composition. The resin composition was coated onto a tin-plated steel plate, followed by baking at 80° C. for 30 minutes to obtain a cured layer.

<EXAMPLE 9>

60 g of the carbonate group-modified epoxy resin prepared in Example 3 was mixed with 40 g of a melamine resin (Cymel 303 manufactured by Cytec Industries Inc.) to prepare a thermosetting resin composition.

The resin composition was coated on a tin-plated steel plate, followed by baking at 170° C. for 20 minutes to obtain a cured layer.

<EXAMPLE 10>

70 g (solid) of the Polyester resin A was mixed with 30 g (solid) of Cymel 303 (a melamine resin manufactured by Cytec Industries, Inc.) to prepare a thermosetting resin composition.

The composition was coated on a tin-plated steel plate, followed by baking at 140° C. for 20 minutes to obtain a cured layer. Curability test was carried out by the conditions shown in Table 1, and results are shown in Table 1.

<EXAMPLE 11>

75 g (solid) of the Polyester resin B was mixed with 25 g (solid) of Yuban 20SE-60 (a melamine resin manufactured by Mitsui Toatu, Ltd.) to prepare a thermosetting resin composition. The composition was coated on a tin-plated steel plate, followed by baking at 120° C. for 20 minutes to obtain a cured layer. Then, the same tests as in Example 8 were carried out.

<EXAMPLE 12>

60 g (solid) of the Acrylic resin C was mixed with 40 g (solid) of Cymel 303 (a melamine resin manufactured by Cytec Industries, Inc.) to prepare a thermosetting resin composition. The composition was coated on a tin-plated steel plate, followed by baking at 140° C. for 30 minutes to obtain a cured layer. Then, the same tests as in Example 8 were carried out.

<EXAMPLE 13>

60 g (solid) of the Acrylic resin D was mixed with 30 g (solid) of Sumidule N3500 (an isocyanate manufactured by Sumitomo Bayer Urethane, Ltd.) to prepare a thermosetting resin composition. The was coated on a tin-plated steel plate, followed by baking at 110° C. for 20 minutes to obtain a cured layer. Then, the same tests as in Example 8 were carried out.

<EXAMPLE 14>

70 g (solid) of the Acrylic resin C was mixed with 30 g (solid) of Cymel 303 (a melamine resin manufactured by Cytec Industries, Inc.) to prepare a thermosetting resin composition. The composition was coated on a tin-plated steel plate, followed by baking at 190° C. for 20 minutes to obtain a cured layer. Then, the same tests as in Example 8 were carried out.

<EXAMPLE 15>

80 g (solid) of the Acrylic resin C was mixed with 20 g (solid) of Yuban 20SE-60 (a melamine resin manufactured by Mitsui Toatu, Ltd.) to prepare a thermosetting resin composition. The composition was coated on a tin-plated steel plate, followed by baking at 160° C. for 20 minutes to obtain a cured layer. Then, the same tests as in Example 8 were carried out.

<EXAMPLE 16>

60 g (solid) of the Acrylic resin D was mixed with 40 g (solid) of Yuban 20SE-60 (a melamine resin manufactured by Mitsui Toatu, Ltd.) to prepare a thermosetting resin composition. The composition was coated on a tin-plated steel plate, followed by baking at 100° C. for 20 minutes to obtain a cured layer. Then, the same tests as in Example 8 were carried out.

<EXAMPLE 17>

60 g (solid) of the Polyester resin A was mixed with 30 g (solid) of Cymel 303 (a melamine resin manufactured by Cytec Industries, Inc.) to prepare a thermosetting resin composition. The composition was coated on a tin-plated steel plate, followed by baking at 160° C. for 20 minutes to obtain a cured layer. Then, the same tests as in Example 8 were carried out.

<COMPARATIVE EXAMPLE 1>

The same procedures as described in Example 8 were repeated except that Araldite 6071 in place of the epoxy resin prepared in Example 1 was employed to obtain a thermosetting resin composition.

<COMPARATIVE EXAMPLE 2>

The same procedures as described in Example 9 were repeated except that Araldite 6071 in place of the epoxy resin prepared in Example 3 was employed to obtain a thermosetting resin composition.

<COMPARATIVE EXAMPLE 3>

The same procedures as described in Example 10 were repeated except that the Polyester Resin A' in place of the polyester A prepared in Example 4 was employed to obtain a thermosetting resin composition.

Properties evaluated in relation to the cured layers are shown in Table 1. Evaluations related to their curability were conducted by xylene-rubbing test (100 cycles), followed by the observation of their external appearances. Evaluations in relation to their water resistance were conducted by their immersion in water at 40° C. for 10 days, followed by the observation of their external appearances.

TABLE 1

| | Example | | | | | | | | | |
|---|---|---|---|---|---|---|---|---|---|---|
| | 8 | 9 | 10 | 11 | 12 | 13 | 14 | 15 | 16 | 17 |
| Curability | NC | SC | SC | NC | SC | NC | NC | NC | NC | NC |
| Water resistance | NC | NC | NC | NC | NC | NC | NC | NC | NC | NC |

TABLE 2

| | Comparative Example | | |
|---|---|---|---|
| | 1 | 2 | 3 |
| Curability | NC | NC | NC |
| Water resistance | SW | SW | SW |

In Tables 1 and 2, abbreviations NC means "not changed", SC means "slightly changed", and SW means "slightly whitened" in respective cured layer.

While the invention has been described in detail and with reference to the specific embodiments thereof, it will be apparent to those skilled in the art that various changes and modifications can be made therein without departing from the spirit and scope thereof.

What is claimed is:

1. A carbonate group-modified epoxy resin represented by general formula (1):

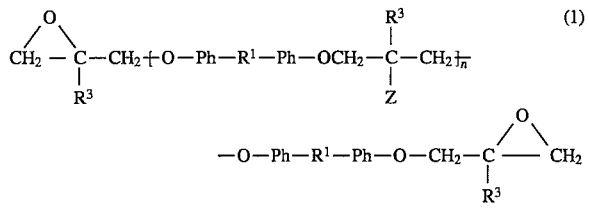

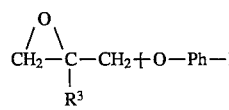

wherein structural unit —$R^1$— is —$CH_2$—,

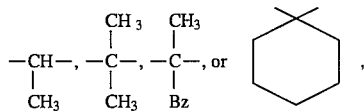

$Bz$ is a phenyl group, and n is at least 1, structural unit —Ph— is

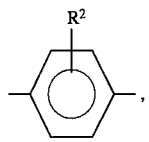

the substituted group $R2$ is a hydrogen atom or a halogen atom, $R3$ is a hydrogen or a methyl group, structural unit Z is

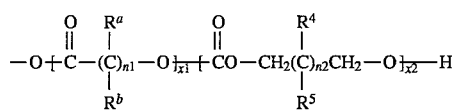

wherein substituted groups $Ra$ and $Rb$ are independently a hydrogen atom or a methyl group, substituted groups $R4$ and $R5$ are independently a hydrogen atom or an alkyl group having carbon number ranging from 1 to 20, n1 is an integer ranging from 1 to 7, n2 is an integer ranging from 0 to 4, x1 is an integer ranging from 0 to 100, and x2 is an integer ranging from 1 to 100.

2. A process for the preparation of a carbonate group-modified epoxy resin as set forth claim 1 which comprises the ring-opening reaction of a cyclic alkylene carbonate represented by general formula (3)

wherein structural unit —R6— is

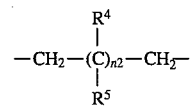

substituted groups $R4$ and $R5$ are independently hydrogen or an alkyl group having a carbon number ranging from 1 to 20, and n2 is an integer ranging from 0 to 4, with an epoxy resin or lactone-modified epoxy resin having hydroxyl groups represented by general formula (2)

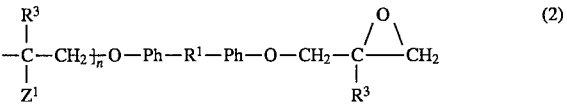

wherein structural unit —$R^1$— is —$CH_2$—,

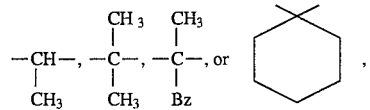

$Bz$ is a phenyl group, and n is at least 1, structural unit —Ph— is

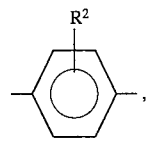

the substituted group $R2$ is a hydrogen atom or a halogen atom, substituted group $R3$ is a hydrogen or a methyl group, structural unit $Z1$ is

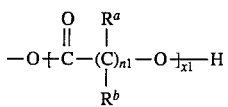

wherein n1 is an integer ranging from 1 to 7, substituted groups Ra and Rb are independently a hydrogen or a methyl group, and x1 is an integer ranging from 0 to 100, in he presence of a catalyst.

3. A process for the preparation of a carbonate group-modified epoxy resin as set forth in claim 2, wherein said catalyst is at least one selected from the group consisting of a Bronsted acid, an onium salt of a Bronsted acid anion, a strongly acidic cation exchange resin, an alkyl alkali metal, an alkali metal alkoxide, an amine selected from quaternary ammonium salt type compounds selected from the group consisting of N,N-dimethyl-N-benzylanilinium antimony hexafluoride, N,N-diethyl-N-benzylanilinium boron tetrafluoride, N,N-diethyl-N-benzylanilinium antimony hexafluoride, N,N-diethyl-N-benzylanilinium trifluoromethane sulfonic acid, N,N-dimethyl-N-(4-methoxybenzyl) pyrizinium antimony hexafluoride, N,N-diethyl-N-(4-methoxybenzyl) pyrizinium antimony hexafluoride, N,N-diethyl-N-(4-methoxybenzyl) toluidinium antimony hexafluoride, N,N-dimethyl-N-(4-methoxybenzyl) toluidinium antimony hexafluoride, a tin compound, a tungsten compound, a titanium compound and a zinc compound.

4. A process for the preparation of a carbonate group-modified epoxy resin as set forth in claim 2, wherein said cyclic alkylene carbonate represented by general formula (3) is dimethyltrimethylene carbonate.

5. A carbonate group-modified epoxy resin as set forth in claim 1, wherein x1 in said structural unit Z is 0.

* * * * *